Patented July 3, 1928.

1,675,499

UNITED STATES PATENT OFFICE.

ERWIN KRAMER, OF COLOGNE-DEUTZ, GERMANY, ASSIGNOR TO GRASSELLI DYESTUFF CORPORATION, OF NEW YORK, N. Y., A CORPORATION OF DELAWARE.

SULPHUR DYESTUFF DYEING COTTON YELLOW.

No Drawing. Application filed August 3, 1927, Serial No. 210,461, and in Germany August 17, 1926.

The present invention relates to new sulphur dyestuffs, more particularly to the dyestuffs which are obtainable by heating 3-nitro- or 3-amino-4-acetyltoluidine of the formula:

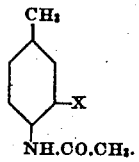

wherein X stands for a nitro- or an aminogroup, with sulphur at elevated temperatures in the presence of 2-8 mols benzidine. I prefer to use temperatures of about 180-200° C. The quantity of sulphur to be added may vary in wide limits. Preferably 2-4 parts by weight of sulphur should be added in proportion to one part by weight of the mixture from acetyltoluidine compound and the benzidine.

My new dyestuffs dye cotton a clear greenish shade of an excellent fastness to boiling.

The following example will illustrate our invention, all parts being by weight:

Example.

8.5 parts 3-amino-4-acetyltoluidine, 47.5 parts benzidine and 112 parts sulphur are heated with stirring for several hours at a temperature from about 180 to 260° C. The ground melt is dissolved in sodium sulphide solution, the dyestuff precipitated with acids, filtered and dried. It forms a yellow powder and dyes cotton from a bath containing sodium sulphide yellowish brown shades which on drying, steaming or acidifying pass into clear greenish yellow.

When using instead of the 3-amoni-4-acetyltoluidine the equivalent quantity of 3-nitro-4-acetyltoluidine a similar dyestuff is obtained.

I claim:
1. As new products the sulphur dyestuffs which are obtainable by heating a compound of the general formula:

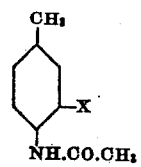

wherein X stands for a nitro- or an aminogroup at an elevated temperature with sulphur in the presence of 2-8 mols benzidine and which dye cotton from baths containing sodium-sulphide yellowish brown shades passing on steaming, drying or acidifying into clear greenish yellow.

2. As a new product the sulphur dyestuff which is obtainable by heating 3-amino-4-acetyltoluidine at a temperature from about 180 to 260° C. with sulphur in the presence of 2-8 mols benzidine and which dyes cotton from baths containing sodium sulphide yellowish brown shades passing on steaming, drying or acidifying into clear greenish yellow.

3. The process for preparing new sulphur dyestuffs which consists in heating compounds of the general formula:

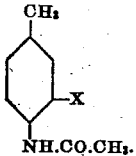

wherein X stands for a nitro- or aminogroup at an elevated temperature with sulphur in the presence of 2-8 mols benzidine.

4. The process for preparing a new sulphur dyestuff which consists in heating 3-amino-acetyltoluidine to a temperature of about 180 to 260° C. with sulphur in the presence of 2-8 mols benzidine.

In testimony whereof I have hereunto set my hand.

ERWIN KRAMER.